US008165466B2

(12) United States Patent
Emery et al.

(10) Patent No.: US 8,165,466 B2
(45) Date of Patent: Apr. 24, 2012

(54) NETWORK OPERATING SYSTEM WITH TOPOLOGY AUTODISCOVERY

(75) Inventors: Jeffrey Kenneth Emery, Ottawa (CA); Guy Claude Fortin, Ottawa (CA); Markus Messerschmidt, Ottawa (CA); Paul Edward Beer, Nepean (CA); Robert George Alexander Craig, Ottawa (CA); Hock Gin Lim, Green Brook, NJ (US); Youxun Duan, Somerville, NJ (US)

(73) Assignee: Alcatel Lucent, Paris (FR)

(*) Notice: Subject to any disclaimer, the term of this patent is extended or adjusted under 35 U.S.C. 154(b) by 0 days.

(21) Appl. No.: 12/781,379

(22) Filed: May 17, 2010

(65) Prior Publication Data

US 2010/0247096 A1 Sep. 30, 2010

Related U.S. Application Data

(62) Division of application No. 10/163,939, filed on Jun. 6, 2002, now Pat. No. 7,747,165.

(60) Provisional application No. 60/298,008, filed on Jun. 13, 2001.

(51) Int. Cl.
*H04B 10/00* (2006.01)
(52) U.S. Cl. ............... 398/30; 398/57; 398/58; 398/25
(58) Field of Classification Search ............... 398/58, 398/25, 30, 57
See application file for complete search history.

(56) References Cited

U.S. PATENT DOCUMENTS 5,905,715 A * 5/1999 Azarmi et al. ............... 370/244
(Continued)

FOREIGN PATENT DOCUMENTS
WO 00/76105 12/2000

OTHER PUBLICATIONS

G. Lehr et al., "Management of all-optical WDM networks: First results of European research project MOON", Network Operations and Management Symposium, NOMS 98, IEEE New Orleans, LA, USA, pp. 870-879 Feb. 15, 1998, XP010267453.

(Continued)

*Primary Examiner* — Agustin Bello
(74) *Attorney, Agent, or Firm* — Capitol Patent & Trademark Law Firm, PLLC (57) ABSTRACT

The network operating system includes an embedded platform for controlling operation of an agile optical network at the physical layer level. At the module embedded level, each module (card-pack) is provided with an embedded controller EC that monitors and control operation of the optical modules. At the next level, each shelf is provided with a shelf processor SP that monitors and control operation of the ECs over a backplane network. All optical modules are connected over an optical trace channel to send/receive trace messages that can then be used to determine network connectivity. At the next, link management level, a network services controller NSC controls the SPs in a negotiated span of control, over a link network. The control is address-based; each NSC receives ranges of addresses for the entities in its control, and distributes these addresses to the SPs, which in turn distribute addresses to the ECs in their control. One of the SPs operates as a router on the link network to relay signaling and control to all entities based on their address. Each NSC constructs, from queried information, a network topology fragment for the embedded elements under its control. A distributed topology system (DTS) shares this topology information with neighboring NSC's to build a complete network view, which can be used by all interested network applications.

13 Claims, 8 Drawing Sheets

U.S. PATENT DOCUMENTS

| | | | |
|---|---|---|---|
| 6,185,197 B1* | 2/2001 | Cheung Yeung et al. | 370/328 |
| 6,259,679 B1 | 7/2001 | Henderson et al. | |
| 6,351,487 B1* | 2/2002 | Lu et al. | 375/225 |
| 6,647,428 B1* | 11/2003 | Bannai et al. | 709/245 |
| 6,687,247 B1* | 2/2004 | Wilford et al. | 370/392 |
| 6,687,463 B1* | 2/2004 | Hutchison et al. | 398/83 |
| 6,728,484 B1* | 4/2004 | Ghani | 398/42 |
| 6,728,486 B1* | 4/2004 | Hutchison et al. | 398/83 |
| 6,760,512 B2* | 7/2004 | Pepper | 385/27 |
| 6,823,219 B2* | 11/2004 | Lee et al. | 700/19 |
| 6,862,622 B2* | 3/2005 | Jorgensen | 709/226 |
| 6,934,472 B2* | 8/2005 | Chang et al. | 398/51 |
| 6,947,669 B2* | 9/2005 | Wu et al. | 398/57 |
| 6,973,041 B1* | 12/2005 | Duschatko et al. | 370/244 |
| 6,983,362 B1* | 1/2006 | Kidder et al. | 713/1 |
| 7,013,084 B2* | 3/2006 | Battou et al. | 398/45 |
| 7,123,592 B2* | 10/2006 | Geile et al. | 370/307 |
| 7,199,921 B2* | 4/2007 | Kaspit et al. | 359/337.4 |
| 7,346,008 B1* | 3/2008 | Bylsma et al. | 370/255 |
| 2001/0020935 A1* | 9/2001 | Gelbman | 345/173 |
| 2001/0021050 A1* | 9/2001 | Paik | 359/139 |
| 2002/0080804 A1* | 6/2002 | Ando et al. | 370/401 |
| 2002/0109879 A1* | 8/2002 | Wing So | 359/118 |
| 2002/0141013 A1* | 10/2002 | Patel et al. | 359/124 |
| 2002/0171886 A1* | 11/2002 | Wu et al. | 359/110 |
| 2002/0176131 A1* | 11/2002 | Walters et al. | 359/118 |
| 2004/0059921 A1* | 3/2004 | Bianchi | 713/185 |
| 2004/0100684 A1* | 5/2004 | Jones et al. | 359/337.11 |
| 2006/0050862 A1* | 3/2006 | Shen et al. | 379/219 |
| 2007/0122149 A1* | 5/2007 | Chaudhuri et al. | 398/45 |

OTHER PUBLICATIONS

Slobodanka Tomic, "Management Information Model for Optical WDM Networks", Interoperable Communications Network, Baltzer Science Publishers, vol. 2, No. 1, pp. 147-160, Jan 1, 1999, XP001011288.

Search Report dated Mar. 4, 2009, issued in European Patent Application No. 02012451.7.

* cited by examiner

NETWORK OPERATING SYSTEM WITH TOPOLOGY AUTODISCOVERY

PRIORITY PATENT APPLICATION

The present application is a divisional application of, and claims the benefit of priority from, U.S. patent application Ser. No. 10/163,939 filed Jun. 6, 2002 now U.S. Pat. No. 7,747,165 which in turn claims the benefit of priority from Provisional Patent Application No. 60/298,008 filed on Jun. 13, 2001. The present application incorporates by reference herein, as if set forth in full herein, the disclosures of U.S. patent application Ser. No. 10/163,939 and Provisional Patent Application No. 60/298,008.

FIELD OF THE INVENTION

The invention resides in the field of optical telecommunication networks, and is directed in particular to providing an agile optical network with a topology autodiscovery system.

BACKGROUND OF THE INVENTION

Due to increased competition and eroding revenue margins, service providers are demanding better yields from their network infrastructure. In response to this demand, the next generation of transport networks must provide mechanisms for creating a number of different classes of service (CoS), while ensuring that the cost of each service is proportional to the revenue it generates. Thus, bandwidth-on-demand for event driven traffic, or creation of bandwidth brokering services are just a few of the new optical layer services that can be created. Attributes such as protection level, latency, priority, transparency, and diversity may also be used to define optical services. These could be either general characteristics of the network or specific characteristics of a connection. As such, CoS considerations need to be taken into account both when planning a network, when routing an individual connection, and when collecting the revenue.

These demands have exposed a number of weaknesses with respect to the current optical networks and their mode of operation.

Traditional WDM (wavelength division multiplexed) networks have a point-to-point configuration, with electrical cross-connects (EXC) provided at all switching nodes. This network architecture allows fairly limited optical layer service offerings. In addition, a point-to-point architecture is very difficult to scale. Thus, the nodes complexity grows with the number of the channels, such that provisioning and engineering operations become more complex, involving extensive design, simulation, engineering and testing, which activities increase the service activation time (SAT).

This large service activation time leads to loss of revenue from a number of perspectives. First, losing contracts due to turn-up time has driven direct loss of sales. More strategically however, it has led to situations where traditional carrier customers (ISPs, etc) have concluded they would be better off owning and operating their own infrastructure. Naturally, once this infrastructure is in place, these traditional customers become competitors, providing services of their own. If the service activation time could be reduced, a carrier would have a significant competitive advantage, increasing its market share and the ability to keep potential competitors out of the market.

Another disadvantage of the current network architecture is the lack of flexibility. Thus, a point-to-point architecture does not have the ability to turn up/down bandwidth rapidly, or/and to provide bandwidth optimized for the data layer needs, even if the equipment for the new service is in place.

To make-up for the lack of flexibility and scalability, there is a current trend to deploy "intelligent" optical networks, where the intelligence resides within the network management. There are many levels of management within any communication network, from element managers controlling individual network elements, to customer billing software, activation and provisioning software and network management systems MNS. Most often, a network management system contains multiple software management platforms for each service and each specific vendor's equipment. However, the growth of nodal complexity discussed above results in increased network management complexity. If a service requires access to multiple network providers' infrastructures, further complications arise when different platforms need to communicate with each other. In addition, the conventional network management systems allow management at the network element granularity, and allow control and monitoring of a limited number of physical layer parameters.

Still another drawback of the current network management systems is the inability to maintain an accurate inventory of the network equipment. Traditionally, the network administrator maintains various operations and support systems, which include an inventory of the equipment making-up the network. For example, TIRKS (Trunks Integrated Records Keeping System), which was developed to mechanize the circuit provisioning process, is often used as the master record keeping system for the data networks. Based on network inventory and connectivity data collected manually at various sites, the TIRKS database outputs appropriate information for programming the nodes of the network. TIRKS system supports now the full range of transmission technologies, such as SONET, European digital hierarchy standards (SDH), digital circuitry hierarchy (DS0, DS1, DS3), and analog voice circuits.

However, such conventional inventory systems have a number of drawbacks. Thus, they need to be integrated with the NMS, by building a user specific interface for each proprietary NMS. Often the inventory does not reflect accurately the network make-up, as the data collection and the updates are entered manually (an up-to-down approach). Also, the information is available network-wide only after it is effectively entered and the inventory system is re-loaded. These systems do not accommodate variants reflecting changes in the operation of a certain device after the equipment has been coded into the inventory, and especially if the equipment is assigned for service. In addition, the conventional inventory systems have a network element level granularity.

As a result, the point-to-point architecture offers a very limited range of services and does not allow for reducing the service activation time (SAT) for this limited range of services. On the contrary, as the network scales-up, the SAT (and the cost) becomes increasingly unacceptable. Today, a typical waiting time for new optical services in a point-to-point network is more than of 120 days.

There is a trend to transit from the point-to-point configurations to a new architecture, where the channels are routed, switched and monitored independently. This new type of network is designed with a view to provide the networks with flexibility, scalability and differentiated CoS levels at the physical layer (channel level).

Since such a wavelength switched network operates on different principles than the point-to-point network, the network management of these networks requires a new architecture. For example, because most of the hardware in a telecommunications network is subject to changing conditions and changing configurations, it is important to dynamically adapt network operation to these changes. Thus, achieving true agility is possible if the network resources, such as terminals, regenerators and wavelengths, are dynamically and automatically allocated to various connections. This in turn implies accurate knowledge of current network resources availability. Also, as the connections are set-up and removed at arbitrary moments and the number of channels on any fiber link changes constantly, each connection must be controlled independently. This means that the performance of the optical modules along each connection needs to be known and accurately controlled.

There is a need to provide a network with a topology autodiscovery system, which provides real-time, accurate knowledge of the network resources, for enabling true agility at the physical layer.

SUMMARY OF THE INVENTION

It is an object of the invention to provide an agile network with a topology autodiscovery system that enables service differentiation.

Accordingly, the invention provides an embedded platform for controlling operation of an agile optical network at the physical layer level, comprising: a module level layer for monitoring and controlling operation of all optical modules that make-up the agile optical network; a shelf level layer for controlling operation of the module level embedded layer and for collecting topology data regarding configuration of the module level embedded layer; and a shelf network for connecting the shelf level embedded layer with the module level embedded layer.

The invention also provides a network operating system NOS for an agile optical network, comprising: an embedded platform organized on embedded domains under control of a shelf processor, for controlling operation of the agile optical network at the physical layer level; a link management platform organized on spans of control SOCs under control of a network services controller NSC, for controlling operation of the agile optical network at the optical connection layer level; and a link-layer network for connecting the SPs in a SOC with the NSC.

According to a further aspect of the invention, an optical layer control plane for an agile optical network of the type provided with a management information base MIB and with an internal signaling and control network, comprises an embedded processing platform for monitoring and controlling operation of one or more all shelves in the agile optical network at optical module granularity, and for collecting in the MIB topology data for all modules and shelves that make-up the agile optical network; a link management platform for monitoring and controlling operation of all network elements of the agile optical network, and for collecting in the MIB topology data pertinent to the network elements; means for hierarchically distributing a unique internal address on the internal signaling and control network to each the module, shelf and network element; and a distributed topology system DTS for hierarchically organizing the data in the MIB to allow independent routing, switching and restoration functions for a connection.

Still further, the invention provides a method of network topology autodiscovery for an optical agile network having a variety of interconnected modules, one or more modules making up a shelf, one or more shelves making up a network element, comprising: hierarchically assigning an internal address to each module, shelf and network element of the agile optical network; and auto-determining the type of each module and validating the configuration of the module against pre-stored module templates.

Advantageously, the topology autodiscovery system of the invention uses a down-to-up approach and operates at the optical modules granularity; the lower layer managed objects report their presence, type and connectivity to the immediately higher layer of management. This approach allows for important reduction of SAT and consequently provides new revenue opportunities for the network providers, such as:

a) All planned or unplanned additions to the network are auto-propagated to the corresponding storage devices so as to be available to all entities that need the information. This includes physical discovery of the nodes, network elements, cards, physical fiber links. This feature reduces importantly the installation time for the equipment supporting a new service.

b) As a result of the knowledge of the current topology, the network operating system allows routing/switching of a connection along the best route for the respective CoS at a touch of a button, substantially reducing the service activation time bottleneck.

c) Still further, it allows reduction of the network engineering time and the probability of installation errors. Thus, the modular architecture of the cards, shelves and racks together with use of hierarchical levels of management and control enable automatic recognition of the topology units at each level. This in turn allows on-line verification of hardware legality, using templates for all topology units. The templates specify legal configurations that are made up of an ordered list of physical entities such as modules, card types, card/slot pairs and shelf types, and interconnections between the entities, i.e., card-to-card, shelf to shelf.

d) Topology autodiscovery also allows disconnecting network control from packaging specifics.

Knowledge of the current network topology also enables important reduction of the provisioning time for a service. Thus, the network operating system is provided with resource utilization capabilities, which indicate when to expand the network, and the infrastructure needed for the expansion, so that the infrastructure can be deployed by the time it is effectively required. The new resources are readily discovered and taken into account.

BRIEF DESCRIPTION OF THE DRAWINGS

The foregoing and other objects, features and advantages of the invention will be apparent from the following more particular description of the preferred embodiments, as illustrated in the appended drawings, where:

FIGS. 4A to 4C illustrate the main components of the embedded platform that enable network topology auto-discovery according to the invention.

FIGS. 7A to 7C show applications of topology autodiscovery feature of the agile optical network of FIG. 1, where FIG. 7A show the block diagram of an optical line amplifier, FIG. 7B show the block diagram of an optical add/drop multiplexer OADM, FIGS. 8A-8C illustrate further applications of the topology autodiscovery feature of the agile optical network of FIG. 1, where

DETAILED DESCRIPTION OF THE PREFERRED EMBODIMENTS

Definitions

The term "agile optical network", (also referred to as 'photonic network', 'all optical network', 'automatically switched optical network ASON', or 'wavelength switched network') refers to a network where an end-to-end connection is established along a trail, the traffic being automatically switched at all or some intermediate nodes in optical format. The nodes of an agile optical network could be optical add/drop multiplexing (OADM) nodes that provide add, drop and optical passthrough, or could be optical cross-connect nodes that provide add, drop and optical switching of the passthrough traffic.

Figure 1:
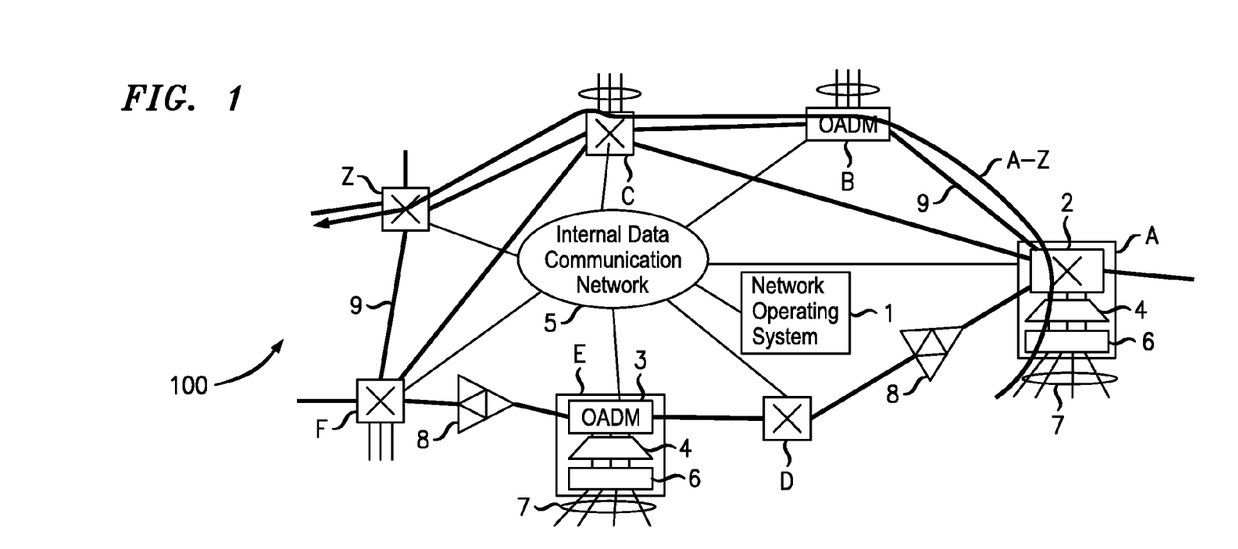
FIG. 1 is an example of an agile optical network where the present invention may be used.

FIG. 1 illustrates an example of an agile optical network 100.

In the example of FIG. 1, network 100 comprises nodes A, B, C, Z, D, E, F, which are also called flexibility sites, connected by bidirectional fiber links 9. Optical switching nodes, such as node A, C, Z, F, D, comprise an optical switch 2 that provides optical switching of the passthrough traffic and in most cases also add/drop of local traffic 7. Optical add/drop multiplexing (OADM) nodes, such as nodes B and E comprise an OADM 3 that adds/drops the local traffic 7 to/from the network clients. FIG. 1 also shows the optical line system 8 comprising optical amplifiers and the associated dispersion compensation and gain flattening equipment connected on WDM fiber links 9, which conditions the DWDM line signal for ultra-long haul.

At the flexibility sites that enable add/drop, an electro-optics system 6 performs on/off ramp of client signals 7 onto/from the optical network and interfaces with the network over an access multiplexing and switching systems 4.

Access multiplexing/demultiplexing system 4 provides distribution of individual wavelengths from the line system 8 to the optical receivers (Rx), and provides aggregation of individual wavelengths from the optical transmitters (Tx) onto the line system. Electro-optics system 6 includes transponders (a long reach (LR) Tx-Rx pair and a short reach (SR) Tx-Rx pair), which are the interface between the network and the user's equipment. Regenerators (a LR Tx-Rx pair) are also part of the electro-optics system 6; they provide OEO-based wavelength regeneration and conversion in the network core. Regenerators are switched in a route only when necessary for signal conditioning and/or wavelength conversion. Thus, a connection A-Z may travel between the source node A and the destination node Z in optical format, as shown in FIG. 1. However, if the distance between the source and the destination is greater than the reach of the respective channel, the signal is regenerated at selected intermediate sites.

An embedded transponder interface, provided on the client's platform (not shown) is also available for converting short reach client interfaces to long reach capable optical signals under the supervision of the line system.

FIG. 1 also shows a network operating system NOS 1, which controls network 100. NOS 1 allows, among other functions, end-to-end connection provisioning without manual intervention, discovery of nodes and links, selective regeneration for the passthrough channels in need of conditioning, full transmitter wavelength agility and assignment, photonic layer UNI (user network interface). It also allows fault monitoring, photonic layer network management, and contributes to automated commissioning, integrated planning and engineering applications. The management and control functions are supported over an internal data communication network IDN 5.

A "connection" is a logical route from a source node, generically referred to as node A, to a destination node, generically referred to as node Z. A "route" or "trail" refers to a specific route for the A-Z connection. In the example of FIG. 1, connection A-Z uses path ABCZ.

A "link" refers to the equipment (could be optical amplifiers, dispersion compensators, etc) and the fiber between two successive nodes. A link may include one or more fibers and the associate equipment. An example of a link is C-B in FIG. 1.

An "optical path" refers to the route or the partial route traveled by a channel in optical format. Thus, a route may be comprised on one optical path, if no OEO conversion is needed between nodes A and Z, or may be comprised of a number of optical paths, if regeneration/wavelength conversion is necessary at some intermediate nodes. NOS 1 has the ability to determine if regeneration/wavelength conversion is necessary and to insert a regenerator at the appropriate intermediate node.

The term "network resources" refers to the network equipment and wavelengths. For the example of FIG. 1, this term refers to all modules, shelf units, and network elements that make-up network 100, and all wavelengths available for transporting client signals over the network.

The term "network element (NE)" refers to the equipment that performs a network-level operation, such as an optical switch, an OADM, an optical line amplifier. A NE could be made of one or more shelf units or bays.

A "module" refers to a card-pack equipped with optical modules to provide a specific functionality. For example, network 100 uses Raman modules, core switch modules, etc.

The term "topology data" refers to information regarding the identity, type, connectivity and status (allocation to a connection) of a network entity (resource or service). It may also include the address of the respective entity on network 5.

To enable true agility, the NOS 1 of photonic network 100 must maintain an updated view of the network configuration, resources and their current allocation to connections. This is possible by replacing the current up-to-down manual inventory management, with an automated down-to-up peer-to-peer topology autodiscovery, where all managed elements report their presence and status to the NOS.

The topology autodiscovery feature according to the invention is enabled mainly by:

1. An embedded processing platform at the physical layer and the associated signaling and control, to allow independent monitoring and control of all connections at optical modules granularity.

The design of the embedded platform is modular, being based on commonality of hardware design. Thus, the arrangement of the optical modules and components on the cards takes into account a scalable growth of the hardware. The modules are built on standard cards, the shelves have a common hardware structure and a standard backplane; the modules can be inserted arbitrarily in the card slots of a shelf. It is evident that use of a modular structure significantly simplifies the manufacture of the network elements, node/network hardware configuration, and as a result, network engineering and provisioning. Along with the advantage of keeping the number of hardware entities to a minimum, commonality of hardware design also allows a simplified structure of the control and management of the network, including the topology auto-discovery feature. The above referenced priority US provisional patent application Docket 1009P provides details on this feature. This application is incorporated herein by reference.

2. Provision of an optical trace channel between all modules of network 100 and extension of data communication and signaling at the optical module and component layer. This allows a hierarchical, down-to-up reporting of network configuration, so that the network can build an up-to-date view of its configuration. A distributed topology system DTS allows use of this information by all interested entities in the network.

3. Address based network management and control. All optical connections, modules, shelf units, NEs of photonic network 100 have a unique address on internal network 5. This address is used by various tasks of the NOS 1, such as topology discovery, automatic routing and switching, management and control of connections, etc.

Figure 2:
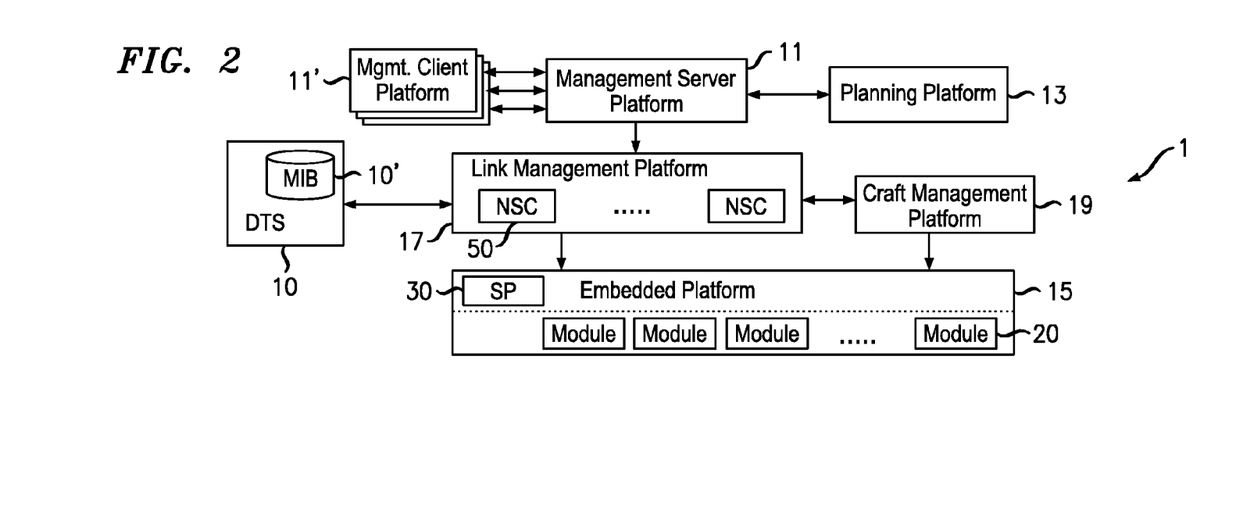
FIG. 2 shows the computing platforms of the network operating system NOS for the agile optical network of FIG. 1.

FIG. 2 shows a high level diagram of the computing platforms of the network operating system 1.

The management and control functions of the NOS 1 have a layered architecture that builds on a modular hardware structure. The computing platforms include an embedded processing platform EP 15 which operates at the module and shelf layer, a link management platform 17, which operates at the link and connection layer, and a network management platform NMP 11, which operates at the network layer.

The embedded processing platform 15 has two distinct layers of processing. At the module level, a circuit pack (module) layer includes all modules 20 that make-up the optical network. A module is provided on a standard card (the term "standard" refers to a universal card, with a similar layout and a similar hardware architecture) that is equipped with the respective optical modules to provide a specific functionality. A module 20 may occupy one or more slots in a shelf. For example, a Raman amplification module occupies two slots, an optical add-drop module occupies four slots, etc.

At the shelf level, a shelf processor (SP) 30 distributes addresses to each module in a respective embedded domain under its control, and collects topology data based on these addresses and adjacency information. Each SP 30 determines if the modules in the respective embedded domain form a legal entity and alarms illegal configurations. Each SP 30 manages and controls the respective embedded domain over a shelf network, and provides an interface with the link management platform 17.

The link management platform 17 comprises a network services controller (NSC) 50 for each switching node, such as nodes A, C, Z in FIG. 1, to provide the compute resources required to perform link and node management and control.

Relevant to this invention is the role of NSC platform in topology discovery, configuration validation, and topology data collection. Other functionality of link management platform 17 includes e.g. end-to-end routing and switching of A-Z connections.

Thus, each NSC manages and controls the shelf units in a negotiated span of control (SOC). A site network and an optical line network allow communication between the NSC and the managed objects in its SOC. A NSC 50 distributes addresses to all shelf processors in the SOC, determines if the shelf units form a legal entity and alarm illegal configurations. The MIB (management information base) 10' maintains an accurate, current topology information at nodal, link and module granularity. Each NSC 50 constructs, from queried information a topology fragment 55, which is stored in the MIB to provide a complete view of the network. The distributed topology system DTS 10 provides interfaces between the MIB and all applications of the NOS 1 that use this data.

Platform 17 also has a data collection and consolidation role between management platform 11 and embedded processing platform 15. Thus, MIB 10' also maintains and provides remote access to all operation, administration and maintenance (OA&M) data. This performance information is distributed within the network, and is cross-referenced with the respective topology information by DTS 10, to enable control of performance of each A-Z connection from NSC platform level.

At the highest level, the management server platform 11 provides the compute resources required to perform network management. Typically, it interacts with a planning platform 13 and the platform 17. The management platform 11 comprises a plurality of applications, such as performance, fault, configuration and security management applications. Also common applications, such as system management and software distribution, reside preferably on platform 11. Relevant to this invention is the role of platform 11 in distributing unique address ranges to all NSC's, and maintaining these addresses inaccessible to the network clients. One or more management client platforms 11' may be connected to the management server platform 11.

The planning and engineering functions reside on planning platform 13, at the same layer but separate from the management platform 11, to enable off-line planning and engineering of the network. The constructed network can be shared with the management platform 11 e.g. for optimizing network evolution plans based on most up-to-date network data. Platform 13 also allows the provider to specify the network operating targets such as dispersion, power per channel, channel usage, etc.

A craft platform 19 enables simple nodal management and control of any platform over interfaces to the link management platform 17 and embedded platform 15. It provides the ability to query and set various nodal parameters, to remotely access and launch management platform applications, etc. It can simultaneously contact more than one platform offering simplified network segmentation functions (for example, establishing a connection between two nodes).

The decision of which software functions reside on which platforms is determined by a number of factors, including response-time requirement, availability requirement, reaction-time requirement, and scalability requirement. A software function may need to reside on more than one platform. Details on functionality of platforms 11, 13, 19 are provided in the priority US provisional patent application Docket 1009 identified above, which is incorporated herein by reference.

The planning, management, NSC and embedded platforms are based on a common object model that is supported by all applications, and a common object definition language. This guarantees compatibility across domains without translation layers. Examples of common object models are the topology model and the NE model.

Separate application-specific models are for example defined for the routing and switching mechanism at the NSC platform.

Embedded Platform.

Figure 3:
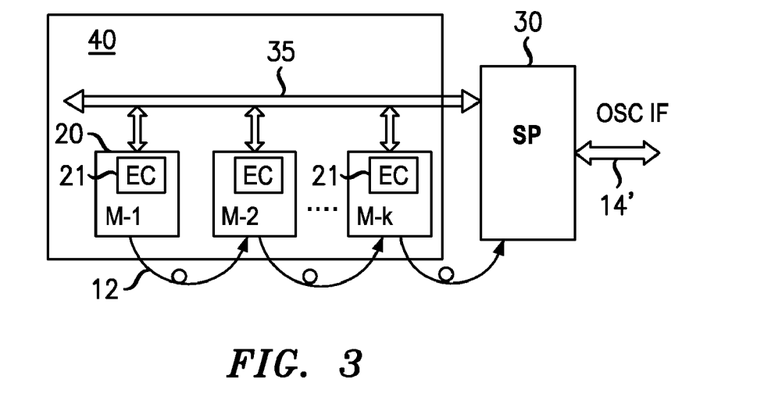
FIG. 3 illustrates an embedded domain.

As shown in FIG. 3, the embedded platform 15 is organized on module-level embedded domains 40 operating under the supervision of a shelf processor SP 30.

FIG. 3 shows intuitively a plurality of modules (card-packs) 20 in a domain. The embedded domains can be classified into node embedded-layer domains, and link embedded-layer domains, depending on the type of the modules in the domain. For example, a switch shelf with the core switch modules and the respective SP forms a node embedded-level domain. A line amplifier shelf with the modules of an optical line amplifier forms link embedded-layer domain.

Each module is provided with an embedded controller 21, which supports data communication through a shelf network 35 to its SP 30.

Shelf network 35 is provided over a standard backplane. Data communication includes, from the EC 20 to the SP 30, transmission of OA&M (operation, administration and maintenance) data, and of card/module identification information. It further includes from the SP 30 to the EC 21, transmission of operational targets for the optical modules (devices), address distribution. This network is preferably a LAN using Ethernet as the L2 protocol and IP as the L3 protocol.

A module 20 is also connected with the peer modules over an optical trace channel OTC 12. OTC 12 is a unidirectional channel that travels, according to a preferred embodiment of the invention, between modules 20 in a paired fiber (intra-shelf optical connections), between shelves on two unidirectional optical channels sharing a two-fiber ribbon cable with the traffic (inter-shelf optical connections), and between flexibility sites on 8 unidirectional channels (sharing the fiber with the traffic) in an eight-fiber ribbon cable. Preferably, the wavelength for this channel is selected at 1310 nm, while the traffic uses L-band. It can also use a separate, tandem fiber.

The OTC links 12 may for example use an Ethernet over fiber protocol. Ethernet is preferred since it is a widely established and understood networking protocol. Also, the hardware is available through many vendors, and supply is guaranteed. While currently the required user data rate for this channel is 10 Mb/s, the links are preferably designed using a higher, 100 Mbps data rate, since this channel could be used in the future for new applications and higher possible data rates. Also, most integrated optical transceivers on the market are designed for bit rates of 50 Mbps and higher, and may not support lower bit rates.

The trace messages are a collection of identifiers for each entity along the respective optical segment, reported to the respective shelf processor. An identifier may for example include the NE, shelf, slot and port identification (NE-ID, ShelfID, SlotID, PortID). If three systems A, B and C, are interconnected, then system A would report itself on the trace channel 12 and send a trace message {A} to the next downstream system B. System B receives trace message {A} and reports itself and sends a trace message {A, B} to the next downstream system C. System C receives A, B and reports itself and sends the trace message {A, B, C} to the next system on the fiber, etc.

All SPs 30 have also access to signaling and control data carried between the sites by OSC (optical service channel) 14. OSC 14 is a bidirectional channel operating at 1510 nm and multiplexed with the traffic on the WDM fiber 9. This channel is used in traditional point-to-point networks for signaling and data communication across the optical spans. In network 100, this channel also transports topology data (and other signaling and control data) between the nodes. In each direction, OSC may be for example inserted at the postamplifier module of a respective site, accessed at all optical line amplifier modules and extracted at the preamplifier module at the next flexibility site. As a more particular example, the preamplifier, postamplifier and line amplifier used in network 100 include a standard Raman card provided with bidirectional OSC access.

It is to be noted that the interface 14' to OSC is denoted with the same reference number as the OSC 14, using the character 'prime'.

Figure 4A:
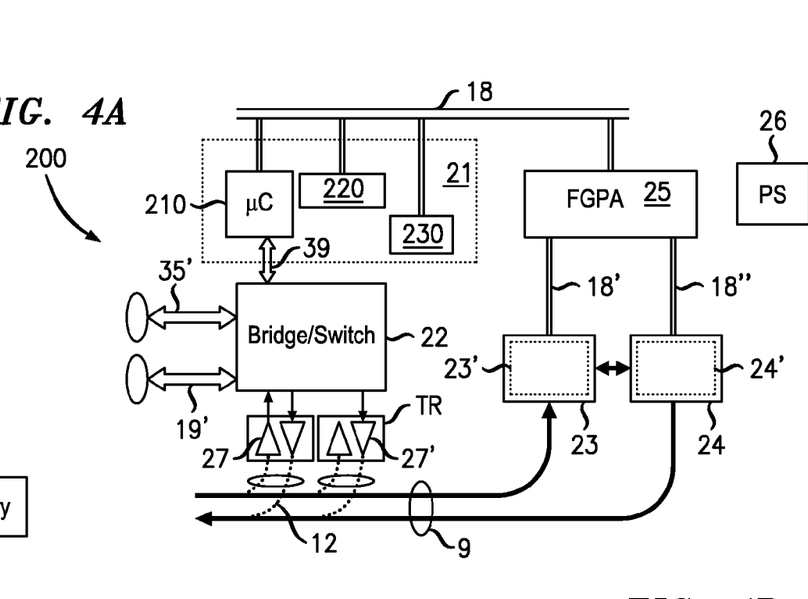
FIG. 4A shows an example of the components of the embedded platform at the optical module level.
Figure 4B:
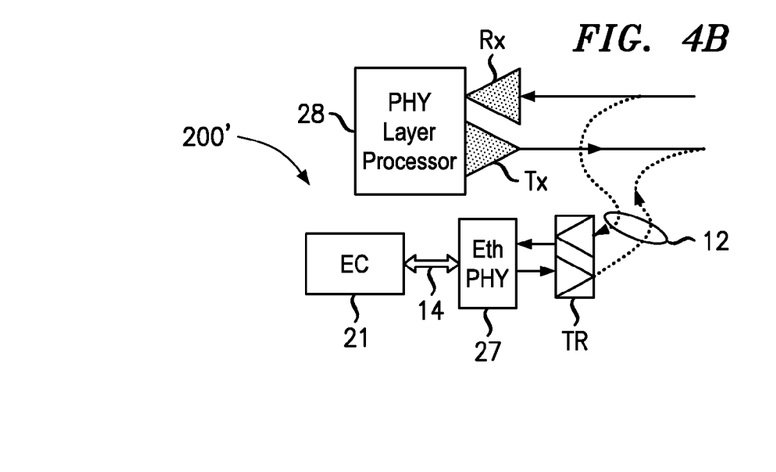
FIG. 4B shows an example of the components of the embedded platform at the optical terminal level.
Figure 4C:
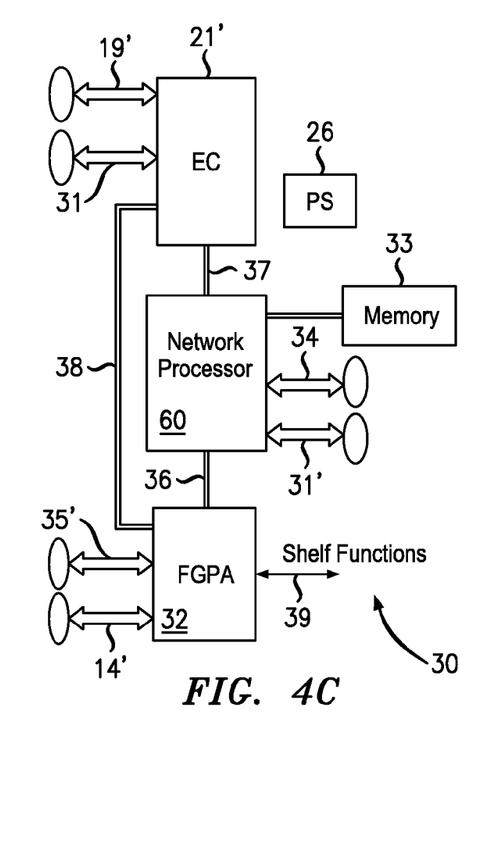
FIG. 4C shows an example of the embedded controller for the shelf units.

FIGS. 4A-4C show a high level view of the entities of the embedded control.

As shown in FIG. 4A, the modules are provided on a standard card 200. Each card 200 is equipped with an embedded controller EC 21 and one or more connector arrays 23', 24'. The optical modules 23, 24, that make the card specific, are inserted in these connector arrays. For example, an EDFA (erbium doped fiber amplifier) module includes a pair of amplifier modules for amplification of all channels in the WDM signal. A core switch card for example comprises an amplifier and a blocker (a programmable optical filter).

A FPGA 25 is provided on cards 20 for connecting modules 23, 24 to EC 21 over a shared interface 18 and over a local bus 18', 18", respectively.

The WDM signal arrives and leaves the module(s) as shown at 9 (WDM fiber), and the respective module 23, 24 performs on the payload signal such functions as amplifications, broadcasting, splitting, combining, filtering, to name a few. The OTC/OCC 12 is split/combined from/with the WDM signal in this embodiment; the trace channel is directed to EC 21 and the WDM signal is directed to the modules 23, 24. Trace transceivers TR, including a respective receiver 27 and transmitter 27', are used for E/O and O/E conversion of the trace signal (i.e. the trace signal travels in optical format while the microcontroller operates in electrical domain).

A bridge/switch 22 is used for distributing the trace signals to/from EP 21 from/to the shelf network 35 over interface 35'. It is preferably an 8-port bridge, up to 6 ports being used for the incoming and outgoing trace signals for each respective embedded domain. Interface shown at 19' uses the $8^{th}$ port of the bridge 22 to provide access to craft platform 19. Bridge 22 is connected to the microcontroller 220 over an interface 16.

Embedded controller 21 comprises a microcontroller 210, the associated memory 220, and the clock recovery/generation circuit 230. The microcontroller 210 is responsible with performance monitoring, fault sectionalization, signaling, and data communication. Also, microcontroller 210 performs per fiber node-to-node OA&M (operation, administration and provisioning) and per wavelength end-to-end optimization. Other functionality includes control of wavelength and power, such as per-wavelength locking to ITU grid, per wavelength power control, and receiver/transmitter control (decision level control and modulation format control). Microcontroller 210 stores card identification information and basic inventory information in memory 220.

EC 21 identifies the optical module(s) 23, 24 inserted into array connectors 23', 24' based on optical module identification information; it then assemblies card identification information based on the optical modules functionality. Card identification information may comprise in addition to the type, a serial number, a list of versions, and a list of software load versions of all optical modules, which is pre-stored in memory 220.

FIG. 4A also shows a power supply module 26. The connectors for the external connections, including the connections to the backplane, are not shown.

FIG. 4B illustrates an example of the embedded controller provided on the optical terminals. In this embodiment, the EC 21 has a similar configuration as shown in FIG. 4A. Since these modules operate on one channel only, no switch/bridge functionality is required, so that the device 22 is not necessary. A trace transceiver TR terminates/generates the trace channel for the respective route and interface 27 translates the data formats in both directions.

Since the terminal card-packs 200' access the traffic (card packs 20 do not access the traffic), they are provided with data processing capabilities, shown by physical layer processing circuit 28. The terminal cards provide access to the digital wrapper, which allows access to raw and corrected BER (bit error rate), control and status of transmission states (AIS, FERF, LOF).

Card 200' is used for building transponders, regenerators, wavelength converters and embedded transponders. It is designed with wavelength-independent components, so that all channels use the same TR card terminals. The wavelength-specific components, such as the channel laser (Tx) and receiver wavelength dependent electronics (Rx) are provided separately. In the case of an embedded transponder interface, an optical control channel (OCC) is used rather than OTC 12. OCC is a bidirectional channel, transported preferably over the same wavelength as OTC, which connects the access system 4 and the respective embedded terminal, to seamlessly control the operation of the transponder form the respective node.

Card-packs 200' are also provided with a power supply module and connectors (not shown) for external connections.

FIG. 4C shows an embodiment of a standard shelf processor (SP) card that occupies an assigned slot in each shelf. SP 30 comprises a programmable device FGPA 32, a network processor 60 with the associated memory 33 and an embedded controller 21'. The main purpose of the SP 30 is to provide intra-shelf communication between embedded controllers 21 on the modules and the embedded controller 21' on the shelf processor, over interface 35'. SP 30 also provides access to the optical service channel OSC 14 over a L-3 interface 14'. This connectivity is facilitated by FPGA 32 which also provides communication between the network processor 60 and the modules. Shelf functions such as card presence and temperature monitoring are also provisioned, as shown at 39. FPGA 32 is connected with the network processor 60 and with the embedded controller 21' over a respective internal bus 36, 38.

Network processor 60 operates as a router or as a bridge on a link-layer network (160 or 165) as discussed later, which is shown by interface 34. The network processor on the SP of a pre/post amplifier shelf operates as a gateway for the OSC 14. Processor 60 also distributes the signaling and control data pertinent to the modules in the respective shelf domain to embedded controller 21' over internal bus 37 and relays the data pertinent to pair SPs over interface 32 to the link-layer network; communication with the upper layer processing platforms is also established over interface 32. Network processor 60 also communicates over interface 31' with a standard alarm interface module AIM (not shown) that occupies an assigned slot in each shelf.

Embedded controller 21' has a similar structure with the EC 21 provided on the module, and it communicates with the ECs 21 on the modules (card-packs) 20 in the respective shelf over the interface 35'. ECs 21' also communicates via the backplane with AIM via interface 31, and provides access to craft platform 19 over interface 19'. Interfaces 31, 19' are established using for example Ethernet devices (not shown).

At this level, EC 21' provides all modules in the embedded domain with an address on shelf network 35. Based on this unique address, EC 21' provides modules type recognition, data communication provisioning, topology and performance data collection. EC 21' also provides the appropriate software load version for all optical modules requiring an upgrade.

EC 21' validates the configuration of each module of the respective domain 40 based on pre-stored module templates, and validates the shelf configuration based on pre-stored shelf templates. At this level, the templates indicate configuration rules that are made-up of ordered lists of physical entities including card identification information (CII) such as shelf ID, slot ID, port ID, and all valid interconnection between the cards. The memory 220 (see FIG. 4A) may also include a catalog with modules versions, software load versions, and/or other module and card specific information.

Shelf identification information is also stored in the EC 21' memory, and includes for example, in addition to the shelf type, information such as shelf address, HW and SW versions.

For example, the following shelf templates may be used to build an optical network: a tandem pre/post amplifier shelf provided at the input/output of a node flexibility site, a tandem shelf which divides the power of the input signal along a plurality of routes for demultiplexing, a switch access gateway shelf and a gateway interface shelf for dilation of an access tree. Other shelves are for example a line amplifier shelf which amplifies the WDM signal on the line 8 and provides dynamic equalization, and a 16 or a 32 wavelength OADM access shelf which provides add/drop/tandem function for 16 or 32 wavelengths in connection with OADM pre/post amplifier shelf, a transponder shelf (with up to 16 transponders), and a regenerator shelf (with up to 16 regenerator pairs).

Invalid shelf configurations are alarmed. New shelf types may be added to the templates. A shelf can be configured from craft platform 19 (see FIG. 2) directly at this layer using the craft platform provisioning. A shelf can also be configured from the network services platform 17 or from the management platform 11.

Link Management Platform.

Figure 5A:
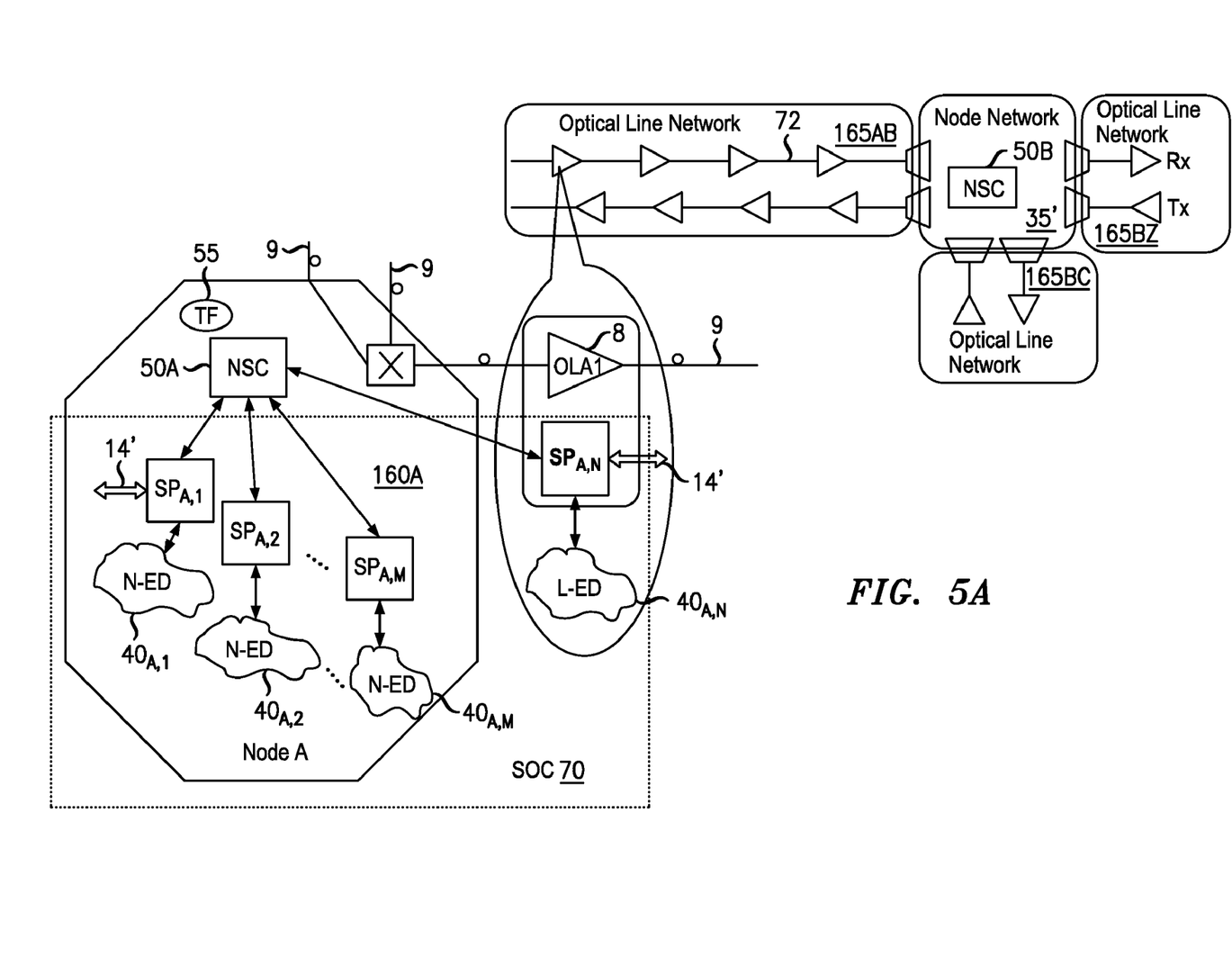
FIG. 5A illustrates the span of control for a network services controller.

FIG. 5A shows the NSC 50A, 50B and 50Z at nodes A, B and respectively Z for an A-Z route. It also shows an optical line amplifier OLA between nodes A and B. We note that the number of line amplifiers between nodes A and B depends on the length of this link; FIG. 5A shows one line amplifier for simplification.

Each NSC, as shown for NSC 50A, manages and controls the shelf units in a respective span of control (SOC) shown at 70. A NSC 50 determines if the shelf units form a legal entity and alarms illegal configurations. A NSC is also responsible for distributing addresses to all network elements in the SOC, and for construction of a topology fragment 55 for the NEs in its SOC.

In the example of FIG. 5A, the span of control 70 for NSC 50A extends over shelf processors $SP_{A,1}$, $SP_{A,2}$ ... $SP_{A,M}$ at node A, each with the respective embedded layer domains $40_{A,1}$, $40_{A,2}$ ... $40_{A,M}$, and a $SP_{A,N}$ on link 9, with the respective embedded domain $40_{A,N}$, and other line amplifier shelves on line 9.

Each NSC validates the configuration of the network elements NE under its control, based on NE templates. At this level, the templates include NE identification information NII for all possible valid NEs configurations and all valid interconnections between the shelves. The NSC compares the actual NE configuration with the templates to validate the configuration of the respective network element.

Examples of network elements are for example a switch, an OADM, and a line amplifier. A switch network element may have templates for a plurality of sub-types, such as a standalone terminal (a terminal with access but no switching capability) or a wavelength cross-connect W×C (2×2, 3×3, or 4×4). The switch templates indicate required shelves and interconnections among shelves. The OADM network element has for example subtypes for 16 wavelengths and 32 wavelengths. Network elements can be provisioned, configured, or reconfigured over the craft interface 19'.

The NSCs communicate with each other and with the SPs in the respective SOC over a link-layer network, which comprises a node network 160 and a line network 165. Node network 160 connects all node embedded domains (N-ED), and the line network 165 connects all the line embedded domains (L-ED). Preferably, the SP 30 on a shelf that terminates the OSC such as $SP_{A,1}$ and $SP_{A,M}$ on FIG. 5A, operate as a L-3 router (e.g. an optical shortest path first (OSPF) router) on the respective network to relay the data to/from the respective managed object to its destination, based on the address of the object. However, other SPs may be configured as a router, including a SP at a line amplifier site in line network 165, if it is supporting cross-line segment routing. Preferably, a second SP in the same SOC could be configured as a router for overtaking this functionality in the case of a faulty operation of the initial router. The remaining SPs 50 in the respective node network 160 and line network 165 operate as a L-2 bridge.

Other variants of routing on the internal data network may be envisaged. For example, the IDN may be configured as a single OSPF area, in which case all SPs at the switching nodes act as L-3 routers. This variant is simpler to implement, but it limits the network size and it requires a different configuration for the line amplifiers at the sites with cross-line segment routing, and also requires re-provisioning of the line amplifiers at the other sites.

Still another variant may partition the internal network into several OSPF areas, each area including several switching nodes. However, this solution requires careful network planning.

A bidding algorithm is used by platform 17 to determine which NSC at the ends of the respective link is the primary controller for the optical line amplifier 8, and which is the secondary NSC. In the example of FIG. 5A, NSC 50A is the primary NSC for OLA1 8, and NSC 50B is the secondary NSC. The decision of which NSC is the primary and which NSC is the secondary NSC is made during system startup and is based on the size of the span of control of each NSC. The criteria that are taken into consideration could for example be the number of links controlled by an NSC, the number of shelves controlled by an NSC, or the address of the NSC.

The NSC functions as a "gateway" to manage the line amplifiers in its span of control. To provide the "gateway" functionality, a NSC maintains a list of line amplifiers 8 it manages as primary NSC, and a list of line amplifiers it is managing as secondary NSC, and it processes requests received only from line amplifiers that it is managing as primary NSC. Typically, this relationship with respect to a certain line amplifier does not change. However, if the communication between the "gateway" NSC and the line amplifier is interrupted (e.g. due to a fiber break), the line amplifier would no longer be reachable. In case of a loss of association (LOA) between the primary NSC and one of its line amplifiers, the management functionality is switched over to a secondary NSC.

Figure 5B:
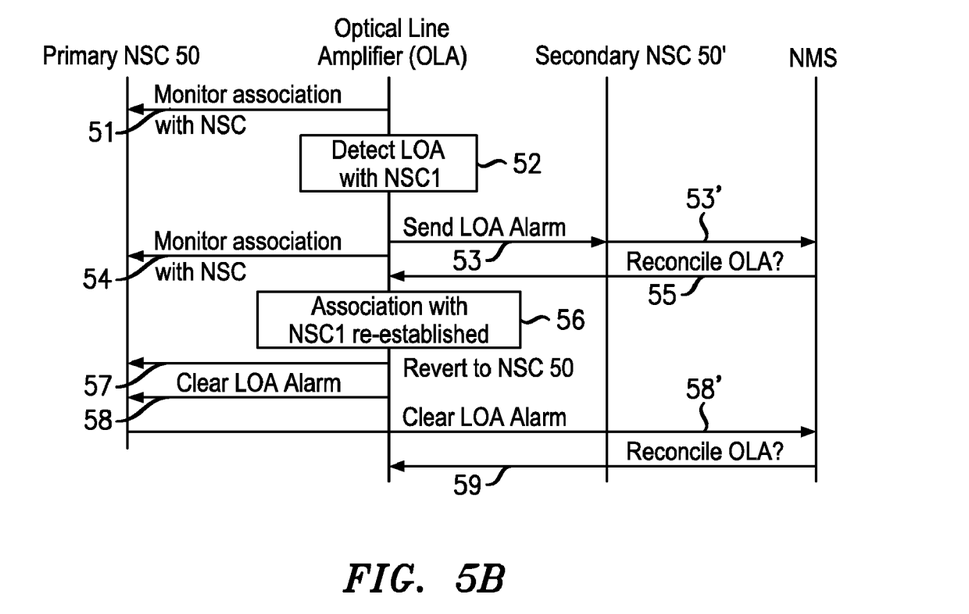
FIG. 5B shows the roles of the primary and secondary NSCs with respect to control of optical line amplifiers.

FIG. 5B shows the operations when the association between a line amplifier and its primary NSC is down for a certain time. Each line amplifier OLA 8 periodically checks the connection to its primary NSC using a heartbeat protocol, as shown at step 51. If the optical line amplifier detects that the connection with the primary NSC 50 has been lost, step 52, the line amplifier emits a LOA ("Loss of Association") alarm. The alarm is sent to the secondary NSC 50' as shown by step 53, and to the NMS, step 53' and used to enable management of this line amplifier through the secondary NSC, step 55.

Alarms have to be re-sent when the association between line amplifier and primary NSC is re-established within the hold-off-time window. The line amplifier continues polling the primary NSC, as shown at 54. After the communication with the primary NSC is re-established, step 56, the line amplifier reverts back to the primary NSC, step 57. It therefore clears the LOA alarm, step 58, which action management through the secondary NSC, step 59.

The NMS listens for LOA alarms (i.e. alarm was raised or cleared) to reconcile the MIB database of that line amplifier. This is necessary in order to avoid events and alarms of a line amplifier being lost due to the failover from primary to secondary management.

Figure 6:
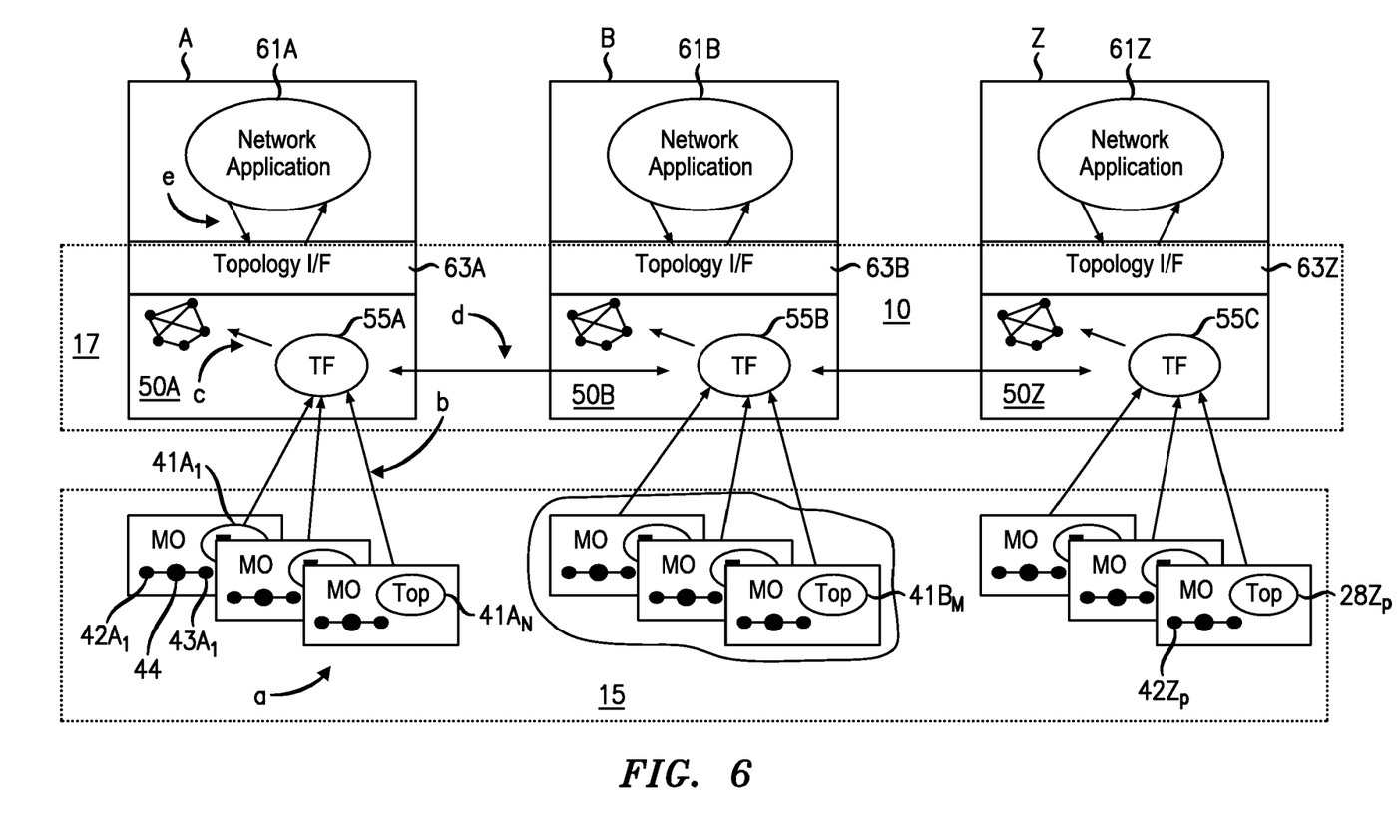
FIG. 6 illustrates the down-up approach for topology data collection.

FIG. 6 illustrates NSC role in generating and maintaining the distributed topology system DTS 10. As also discussed in connection with FIG. 5A, each NSC 50 constructs a topology fragment 55 for the embedded elements under its control, to build a complete network view by putting together the SOC topology fragments.

This information is used by various network applications 61A, 61B, 61Z (e.g. the routing and switching, controllers, etc) which are provided with appropriate topology interfaces 63A, 63B, 63Z.

Topology discovery is hierarchical in nature, using a down-up approach. At the embedded layer level, the managed objects, i.e. the modules, determine their internal and external topology to create a unit of topology $41A_1$ to $41A_N$, called toplet, as shown by arrow a. The internal topology is determined by the type, placement and interconnect order of the circuit packs (modules) on the respective shelf. The external topology comprises the position and identifying information of the neighbors $42A_1$ and $43A_1$ of a managed element $41A_1$. External topology is therefore determined by sending adjacency discovery messages out well-known ports that are mapped to adjacent neighbors over the OTC 12 and OSC 14, as discussed above.

Topology tasks 41 resident on each managed element, forward their toplet information (presence, address and adjacency) on to the respective topology MIB to generate the topology fragments 55A, 55B . . . 55Z, as shown by arrow b. The responsibilities of NSC platform 17 is to assemble the toplets it received into a coherent view of the SOC (the node equipment and the line equipment in the respective SOC) in the context of network 100, as shown by arrow c, and then share this information with the all NSC's 50, so that each NSC can build a complete view of the network, shown at d.

Address Distribution on the Internal Data Communication Network

The particular structure of NOS 1 allows shifting the connection management paradigm from centralized control of circuit routing to address management. Thus, all hardware entities defined in network 100 at all levels of management and control are provided with an address on the internal network, hierarchically distributed by platform 11; topology autodiscovery, as well as monitoring and control of hardware are based on these addresses. All address assignment is automatic. However, the customer may temporarily change an address using the craft interface.

For networks equipped with a NMS (network management system), the NMS provides the address ranges and maintains a correspondence table between this internal address and the external address of the network elements, available to the user. In the absence of a NMS, the customer may provide the ranges.

The NSC acts as the primary distributor of addresses for the line segments and for the flexibility site on which it resides. For the flexibility site, the addresses are permanently assigned once the network element object is created on the NSC. For the line segment, addresses are permanently assigned once the NSCs communicate to establish an end-to-end connection triggered by the customer.

The total number of addresses within a site network 60 address pool should be sufficient to encompass the maximum number of shelves expected with some addresses available for future expansion.

Applications of the Network Topology Autodiscovery Capabilities

A. Provisioning a network element (populating the shelves with cards and connecting the cards and the shelves).

To add a new network element, the user chooses on the GUI (graphical user interface) the NE type/subtype. The GUI lists all shelves required to make-up the respective NE and the shelves that are available on the internal network. The user adds shelves from the "available list" until all required elements are satisfied. Then the list of required elements is compared with the list of the elements available at the respective node.

Then, the cards (modules) are inserted into the shelves. The respective shelf processors query the cards in their domain, by first determining if there is a card in the respective slot, and next by fetching the card ID. After all cards in the shelf are accounted for, the SP determines if the cards form a legal shelf, by checking the auto-discovered configuration against all templates. If the type of shelf checks against the template, the SP reports the shelf ID to its primary network service controller. All SP's perform a similar operation and report to the NSC their identification information.

If the shelf-type is illegal, this is reported to craft platform, which checks if it is a new shelf type or not. In the case of a new type of shelf, a template is prepared and stored with the SP. If the type of shelf is illegal due to an error in the way the cards are inserted, the error is alarmed.

Next, the NSC compares the managed element configuration reported by the shelves against its templates to determine if the NE is of a legal type. If yes, the configuration of the NE can be committed and the NSC creates the logical/topological objects and stores these in the DTS. If not, the craft platform, advises if the NE is of a new type or the configuration is illegal. The NSC alarms if the NE is of an illegal type, or prepares a new template, if the MO is of a new type.

Figure 7A:
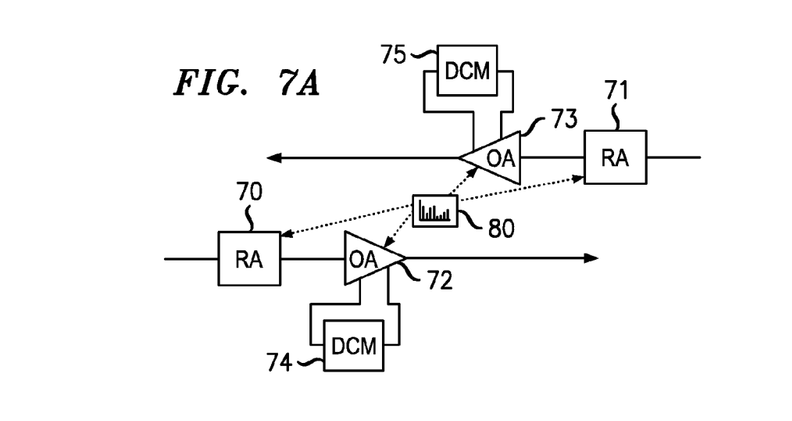
Figure 7B:
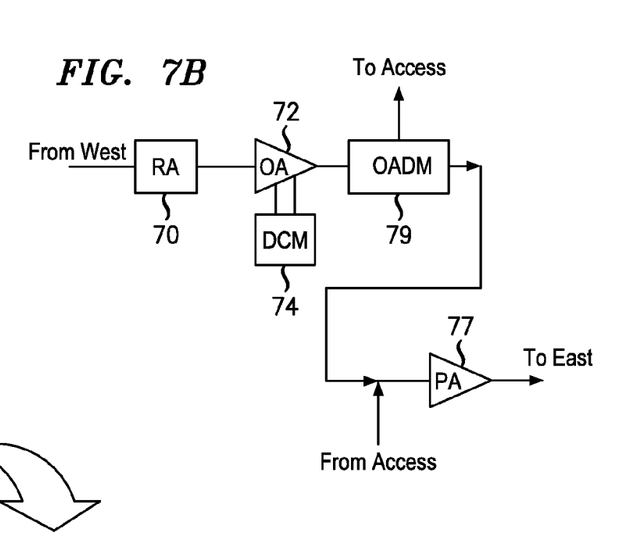
Figure 7C:
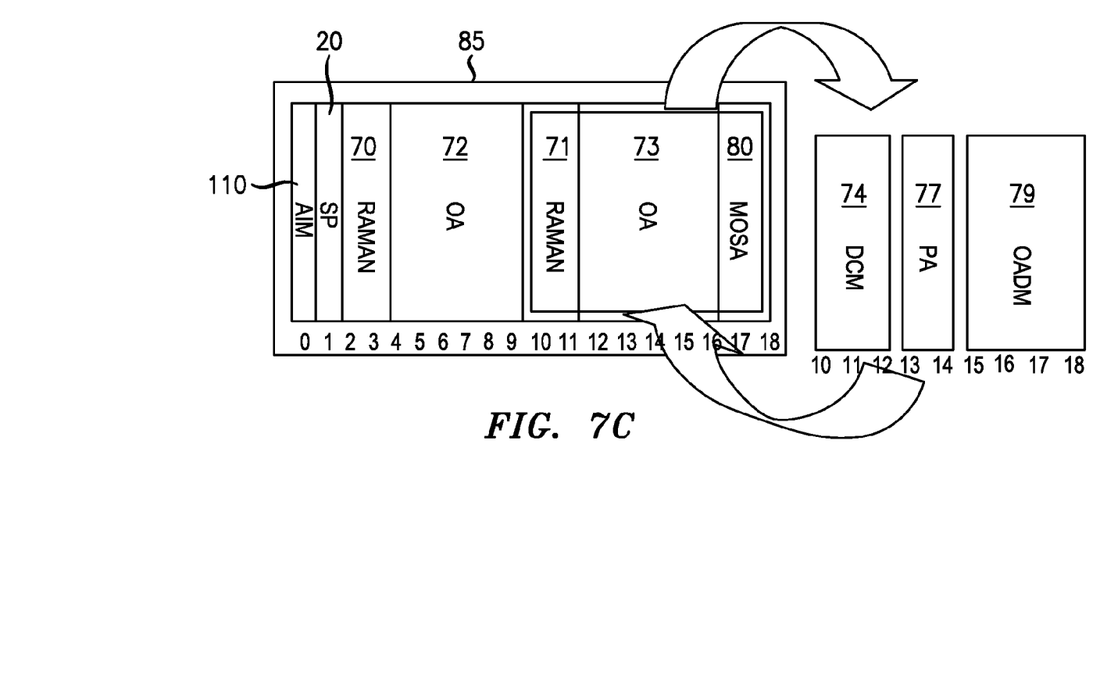
FIG. 7C shows how some card packs are replaced in a shelf to change functionality of the shelf from an optical amplifier to an OADM.

B. FIGS. 7A to 7C show how functionality of a shelf may be changed from an OLA shelf to an OADM shelf.

FIG. 7A show the block diagram of a bidirectional optical line amplifier. For each direction, the line amplifier comprises a respective Raman module 70, 71, an optical amplification module 72, 73 and an optical spectrum analyzer OSA module 80. The dispersion compensating modules DCM 74, 75 are arranged on a subtended shelf at the line amplification sites, and therefore they are not shown in the initial arrangement of the card-packs in the shelf on FIG. 7C.

FIG. 7B show the block diagram of an optical add/drop multiplexer OADM. It comprises a Raman module 70, optical amplification module 72, with a dispersion compensating module DCM 75, an OADM module 79 and a postamplifier 77.

FIG. 7C shows the initial arrangement of the cards of the line amplifier in the shelf 85. By removing the Raman module 71, the optical amplification module 73, and optical spectrum analyzer module 80, and inserting in their slots a DCM 74, a postamplifier 77 and an OADM 79, functionality of shelf 85 is changed from an optical amplifier shown in FIG. 7A to the OADM shown in FIG. 7B. The Raman module 71 and the optical amplification module 73 can be reused in building the OADM line shelf for the reverse direction.

Shelf 85 can be easily configured as a pre-post amplifier shelf, a dual pre-amplifier shelf, a dual post-amplifier, or an OADM drop extension shelf for a switch (not shown).

Once the modules are inserted in the bay, the SP determines the identity of the modules, checks if the modules form a legal shelf by comparing the new configuration with the templates, and then reports the new shelf configuration to the respective NSC.

Figure 8A:
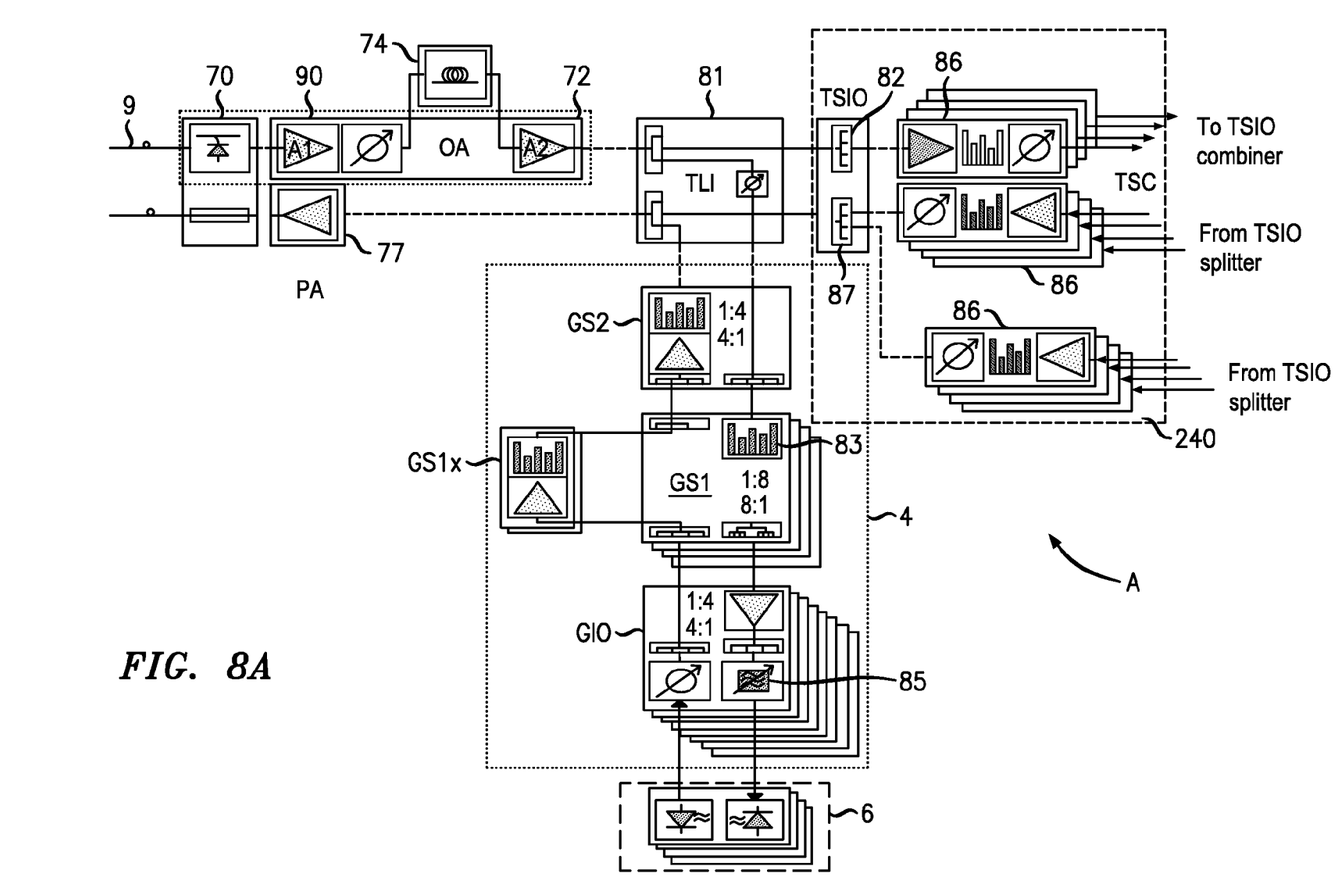
FIG. 8A shows modularity and scalability of a switching node.
Figure 8B:
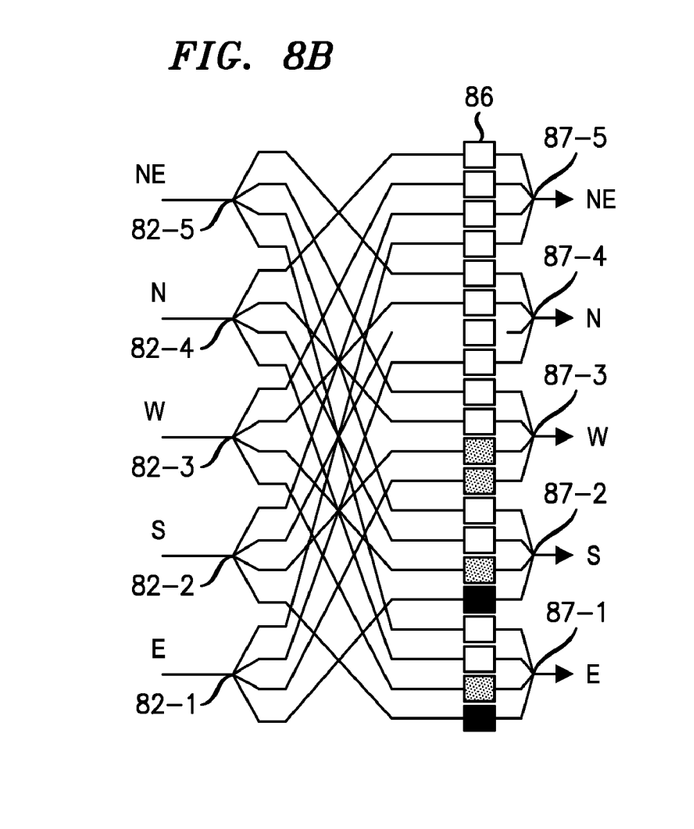
FIG. 8B shows the modularity and scalability of a switch.

C. FIGS. 8A and 8B illustrate examples of further applications of the topology autodiscovery feature of network 100, namely modularity and scalability of the nodes in FIG. 8A, and scalability of the switch in FIG. 8B.

As shown in general in FIG. 1, a switching node, such as node A comprises a switch 2, an access subsystem 4 and electro-optics 6. At the input of the node, a preamplifier 90 is provided for conditioning the WDM signal arriving at the node on line 9. The preamplifier comprises a Raman module 70, an optical amplifier 72 with a DCM module 74 connected in the mid-stage. At the output of the node, postamplifier 77 is provided for conditioning the signal before it is inserted on the line towards the next node. As it can be seen, the same modules are used as for the optical line amplifier and OADM of FIGS. 7A and 7B.

At the output of the preamplifier, the input WDM signal is power split by a terminal line interface (TLI) 81; a first WDM component signal, with all channels in the input WDM signal, is routed to the access system 4, and a second WDM component signal is routed to switch 2.

The access system has an add and drop tree; the drop structure is discussed only. The first WDM component is split along a plurality of branches in stages, from one 'stem' into for example 128 'branches', each terminating on a receiver of the electro-optics system 6. Along each branch, a channel is allowed or blocked according to a current network connectivity map, using a wavelength blocker 83.

A first gateway stage GS2 comprises on the drop side, a 1:4 splitter 84, so that four second gateway modules GS1 may be connected to it. Each GS1 blocks a number of channels in the first WDM component, so that each of the four WDM signals at the output of a module 83 carries different channels. Each of these first stage WDM signals are power divided next along e.g. 8 routes. In this way, each module GS1 supports 8 third stage gateway input-output modules GIO. At this stage, a filter 85 filters-out all channels that are not directed to the receiver connected to the respective branch of the tree.

It is apparent that the number of modules used for this structure depends on the number of the channels in the input WDM signal.

As it also apparent that the access system may be scaled-up from an initial configuration comprising one module GS2, one GS1 module and one module GIO module. For example, at the beginning, GIO module may be successively equipped with up to four transponders TR in this example. Next, a second GIO module may be directly connected to a second port of the GS2 module, and four more transponders can be attached to second GIO module gradually. Or, the second GIO module may be attached to a second port on GS1 module, etc.

As equipment is added (modules, shelves), the new modules report their CII to the SP 20, which verifies the validity of the module and shelf configuration against the respective templates and reports the additional NE to the NSC 50. The NSC at node A verifies the validity of the network element configuration against the templates and updates the topology fragment at the node with the added equipment, so that all applications take into consideration the current configuration of the node.

The structure of switch 2 is also modular being built from tandem switch core TSC modules 86. At the input of the switch 2, the second component of the input WDM signal is split by a tandem switch input/output TSIO module 82, for example into four components, each being routed to a TSC 86. The output of the respective TSC is connected to one of the other lines present at the respective node. Each TSC allows/block a selectable number of channels from the WDM signal to pass or not from the input to the output.

FIG. 8B shows by way of example a 5-way switch 2. The switch may have an initial configuration with only two modules 86, as shown in black on FIG. 8B, for switching two lines S-S and E-E. To add a line W-W, four more modules 86 are added as shown in grey on FIG. 8B. Four lines may be connected using 12 modules 86, five lines would use all 20 modules.

Figure 8C:
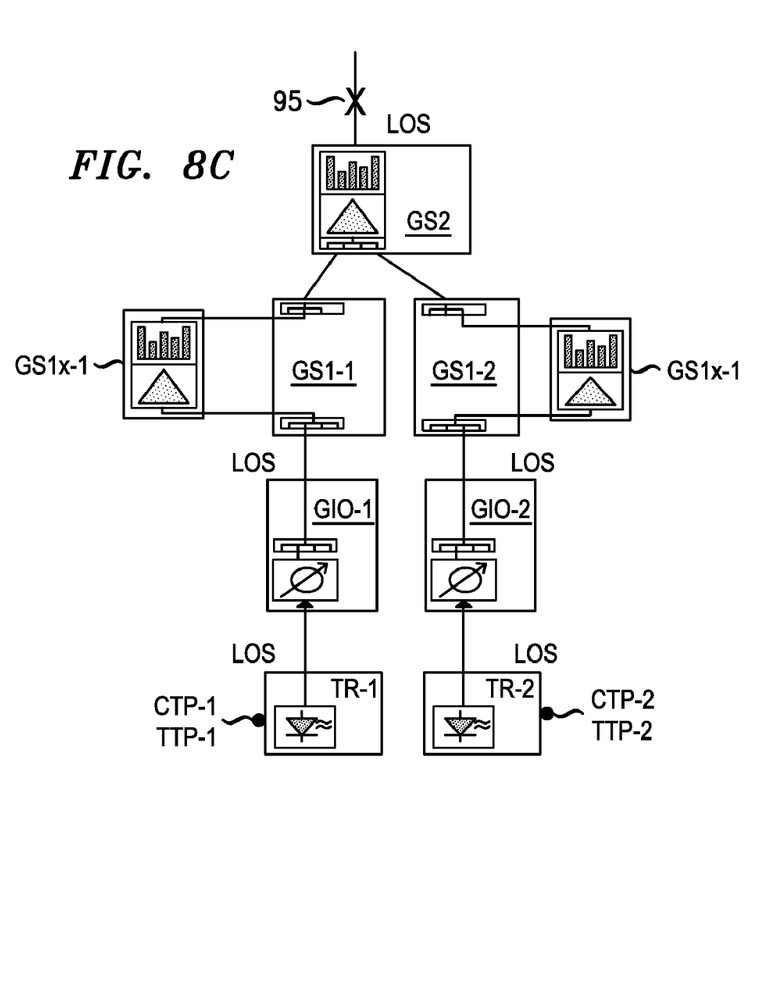
FIG. 8C shows improvements in alarm reporting.

D. Topology autodiscovery also allows simplifying alarm processing, as shown in FIG. 8C. Network 100 uses a generic information model based on M.3100 ITU-T standard Generic Network Information Model, which defines the ME (managed element) physical and logical components. G.875 Standard defines optical specific extensions to M.3100. Autocreation of all of the managed objects is one novel aspect of the model used by the NOS 1 and it does impact on the M.3100 model (this is not the object of the present invention). The objects used in the model are network objects, system objects, equipment objects, termination points objects (which could be trail termination points TTP and connection termination points CTP), OAM (operation, maintenance and administration) objects and topology objects.

FIG. 8C shows a representation for a drop tree comprising a gateway stage GS2 module, that separates the traffic along two branches. A first branch is provided with a gateway stage 1 module GS1-1 with the respective gateway stage 1 expansion GS1X, followed by a gateway input/output module GIO-1 and terminated at transponder TR-1 as shown by connection termination point CTP1 (which is also a TTP). The second branch is provided with a module GS1-2 with the respective expansion GS1X, followed by a module GIO-2 and terminated at transponder TR-2 as shown by connection termination point CTP-2.

If, for example, the fiber is cut at 95 as shown for a drop tree, the respective module GS2 will report a LOS (loss of signal), but also all GS1 and GIO modules and all TR modules along the respective branch will report a LOS. This makes it very difficult to localize the fault. Conforming to the information model, the GS1-1 "affects" CTP-1, and GS1-2 "affects" CTP-2. On the other hand, the CTP-1 is "supported by" GS2, GS1-1, GIO-1 and TR-1, while CTP-2 is "supported by" GS2, GS1-2, GIO-2 and TR-2. Applying the model to the alarms, the LOSs issued by the modules downstream from the cut are labelled as minor, and the LOS at GS1 is labelled as critical.

We claim:

1. An optical layer control plane for an agile optical network of a type provided with a management information base (MIB) and with an internal signaling and control network, comprising:
    a link management platform for monitoring and controlling operation of all network elements of an agile optical network, and for collecting MIB topology data pertinent to network elements;
    a processing platform comprising one or more controllers for monitoring and controlling operation of one or more shelves in said agile optical network at optical module granularity, and for collecting MIB topology data for all modules and shelves that make-up said agile optical network, said controllers serially connected over an optical topology channel (OTC) for enabling the link management platform to discover the current topology of said agile optical network;
    means for hierarchically distributing a unique internal address on said internal signaling and control network to each said module, shelf and network element; and
    a distributed topology system (DTS) for hierarchically organizing the topology data in said MIB to allow independent routing, switching and restoration functions for a connection.

2. The control plane as claimed in claim 1, wherein said processing platform comprises:
    a shelf processor on each shelf of said network; and
    a shelf network for connecting all controllers in a shelf of equipment with a corresponding shelf processor.

3. The control plane as claimed in claim 1, wherein said OTC is a unidirectional channel.

4. The control plane as claimed in claim 1, wherein said DTS comprises interfaces with a plurality of network applications that request access to said MIB.

5. The control plane as claimed in claim 1, wherein said DTS organizes hierarchically all operation, administration and maintenance (OAM) information collected from said modules in said MIB based on said internal addresses.

6. The control plane as claimed in claim 1, wherein said DTS organizes hierarchically all module, shelf and network element templates in said MIB.

7. The control plane as claimed in claim 6, wherein a module template includes module identification data for all modules available in said agile optical network, a list with all valid interconnection between said modules, slot identification data and port identification data.

8. The control plane as claimed in claim 6, wherein a shelf template includes shelf, module, slot, port identification information and a list of valid interconnection between said modules.

9. A method of network topology autodiscovery for an optical agile network having a variety of interconnected modules, one or more of the modules making up a shelf, one or more shelves making up a network element, comprising:
    collecting Management Information Based (MIB) topology data for all modules and shelves that make-up said agile optical network;
    hierarchically assigning an internal address to each module, shelf and network element of said agile optical network;
    reporting the identity and connectivity of all modules in a trace message carried on an optical trace channel of the agile optical network; and
    auto-determining the type of each module and validating a configuration of said module against pre-stored module templates.

10. The method as claimed in claim 9, wherein the collection step further comprising processing said trace message into module level topology data.

11. The method as claimed in claim 10, further comprising:
auto-determining the type of each shelf based on said trace message;
validating the configuration of said shelf against pre-stored shelf templates; and
providing shelf level topology data.

12. The method as claimed in claim 11 further comprising hierarchically storing said module level and shelf level topology data into a MIB based on said internal address.

13. The method as claimed in claim 12, further comprising providing a distributed topology system for accessing said topology data through application specific interfaces to allow a network application to access only network topology data of interest.

* * * * *